United States Patent [19]
Tsuda et al.

[11] Patent Number: 5,431,853
[45] Date of Patent: Jul. 11, 1995

[54] MODIFIED SILICONE OIL-IN-WATER EMULSION DEFOAMING AGENT AND DEFOAMING METHOD USING IT

[75] Inventors: Yasutaka Tsuda; Mitsuru Komatsu, both of Tokyo, Japan

[73] Assignees: Nikko Chemical Institute Inc., Tokyo; Nicca Chemical Co., Ltd., Hukui, both of Japan

[21] Appl. No.: 51,908

[22] Filed: Apr. 26, 1993

[30] Foreign Application Priority Data

Apr. 27, 1992 [JP] Japan .................................. 4-134185

[51] Int. Cl.$^6$ .............................................. B01D 19/04
[52] U.S. Cl. .................................. 252/321; 162/173; 252/358
[58] Field of Search .............................. 252/321, 358

[56] References Cited

U.S. PATENT DOCUMENTS

| | | | |
|---|---|---|---|
| 3,250,727 | 5/1966 | Noll et al. | 252/358 |
| 3,784,479 | 1/1974 | Keil | 252/358 |
| 3,846,329 | 11/1974 | Householder et al. | 252/358 |
| 3,865,544 | 2/1975 | Keil | 252/321 X |
| 4,005,044 | 1/1977 | Raleigh | 252/358 |
| 4,042,528 | 8/1977 | Abe | 252/358 |
| 4,384,976 | 5/1983 | Grünert et al. | 252/321 |
| 5,080,828 | 1/1992 | Terae | 252/358 |

Primary Examiner—Richard D. Lovering
Attorney, Agent, or Firm—Millen, White, Zelano, & Branigan

[57] ABSTRACT

An emulsion type defoaming agent composition formed by emulsifying 5 to 35 weight parts of an organic fluid, 0.5 to 5 weight parts of a silicone oil, 0.5 to 5 weight parts of a hydrophobic silica and 1 to 40 weight parts of a modified silicone oil into water in the presence of an emulsifier is useful as a defoaming agent for aqueous systems, particularly for strongly alkaline aqueous systems.

20 Claims, No Drawings

MODIFIED SILICONE OIL-IN-WATER EMULSION DEFOAMING AGENT AND DEFOAMING METHOD USING IT

BACKGROUND OF THE INVENTION

1. Field of the Invention

The present invention relates to a novel emulsion type defoaming agent composition effective for the prevention of foaming in an aqueous system, particularly in a strongly alkaline aqueous system.

2. Description of the Prior Art

Foaming in aqueous systems causes various kinds of problems in production processes in various industries, such as a decrease productivity, an increase of defect products, a decrease in the packing ratio of products and the like. Particularly in the industry of pulp production, large amounts of foam producing substances are contained in the waste water and the foaming thereof is the important problem that must be overcome.

In the current method of production of pulp, the Kraft process which is a kind of the alkali process has replaced of the sulfite process which used to be the major process of the industry and the Kraft process is currently the major process.

In the Kraft pulp process, the pulp material (material wood chips) is cooked under pressure in a mixed solution of sodium hydroxide and sodium sulfide and the parts other than the fiber in the wood are removed by dissolving in the solution to obtain the product pulp. In the waste water from the digestion which is generally called the black solution, large amounts of sodium salts of the lignin components and other resin components are contained.

Because these substances have foam forming activity foaming occurs during the separation of these substances from the pulp to cause problems in the production process. The black solution remains in the separated pulp and foaming is again a problem in the pulp washing process.

As described in the above, the foaming which occurs process of washing and screening of pulp after the digestion of the pulp decreases of the efficiency of the washing and the operability of the process to a great extent. The foaming which occurs in the paper making process causes various problems, such as a decrease of strength of the produced paper, decrease in the of quality of the produced paper by formation of spots on the paper, breaks in the paper on the paper machine and the like problems.

Therefore, application of a defoaming agent is indispensable in the production of the pulp.

Various kinds of defoaming agents have been proposed. For example, a defoaming composition comprising 1 to 20 weight % of an aliphatic amide, 1 to 15 weight % of an organic polymer soluble in oil, 1 to 50 weight % of a hydrocarbon oil and 0 to 5 weight % of a fat is described in Japanese Patent Publication 1972-7359 and a defoaming composition comprising 70 to 90 weight % of a non-polar organic fluid, 1 to 5 weight % of a hydrophobic silica and 1 to 20 weight % of an organic phosphorus compound is described in Japanese Patent Publication 1977-5686.

An emulsion comprising 0.5 to 10 weight % of a rapidly cooled amide, 0.3 to 10 weight % of a hydrophobic silica, 0.5 to 5 weight % of a polymer, 0.5 to 5 weight % of an emulsifier, 15 to 65 weight % of an oil, 20 to 60 weight % of water, 0 to 3 weight % of a silicone surface active agent, 0 to 0.5 weight % of a solution of formaldehyde and 0 to 0.5 weight % of a silicone oil is reported in the U.S. Pat. No. 4,225,456.

However, these defoaming agent compositions so far reported do not always exhibit satisfactory defoaming activity. Most of the defoaming agents utilized in the process of Kraft production are insoluble in water. When a defoaming agent of this kind is utilized in a large amount, the defoaming agent coagulates by itself and causes undesirable problems, such as formation of pitch, and environmental problems like contamination of waste water with oil and formation of dioxine.

SUMMARY OF THE INVENTION

The present invention accordingly has an object to provide an emulsion type defoaming agent composition which can be produced by a simple process, can prevent the formation of pitch and environmental problems associated with the waste water and has excellent defoaming activity. The present invention also has an object of providing a method of defoaming which uses the defoaming agent composition.

Extensive investigations undertaken by the present inventors with the objects described above lead to a discovery that, by emulsifying a modified silicone oil into water together with a non-polar organic fluid and a hydrophobic silica, a defoaming agent composition which can be produced by a simple process, can prevent the formation of pitch and the environmental problems with waste water and has very excellent defoaming property is obtained. The present invention has been completed on the basis of the discovery.

Thus, in a composition aspect, this invention relates to an emulsion type defoaming agent composition formed by emulsifying a composition comprising 5 to 35 weight parts of an organic fluid, 0.5 to 5 weight parts of a silicone oil, 0.5 to 5 weight parts of a hydrophobic silica and 1 to 40 weight parts of a modified silicone oil into water in the presence of an emulsifier.

In a process aspect method of defoaming which comprises adding the emulsion type defoaming agent composition of this invention to a foaming aqueous fluid continuously at a rate which maintans a constant concentration thereof in the aqueous fluid.

Other and further objects, features and advantages of the invention will appear more fully from the following description.

DETAILED DESCRIPTION OF THE INVENTION

The composition utilized for forming the emulsion type defoaming agent composition of the invention comprises an organic fluid.

Examples of the organic fluid are paraffinic hydrocarbons, naphthenic hydrocarbons, aromatic hydrocarbons, petroleum naphtha and the like. Preferred are paraffinic hydrocarbons.

More specific examples of the preferable organic fluid are liquid paraffin and completely hydrogenated paraffinic hydrocarbons. Liquid paraffin is most preferable among them.

The organic fluid may be a single fluid or as a mixture of two or more kinds.

The amount of the organic fluid in the composition utilized for forming the emulsion type defoaming agent composition of the invention is 5 to 35 weight parts, preferably 8 to 25 weight parts and more preferably 10 to 20 weight parts.

The liquid paraffin purified with complete hydrogenation utilized in the invention is an organic fluid having completely saturated bonds (the iodine value is zero). An excellent defoaming effect with excellent working environment can be achieved with this organic fluid.

In the invention, the liquid paraffin purified with complete hydrogenation and having the following properties, for example, is utilized: a density at 15° C. of 0.84 to 0.865, a kinematic viscosity of 12 to 70 cst (centistokes), preferably 12 to 50 cst, more preferably 12 to 20 cst, an oxidation value of 0.01, the iodine value of 0, a sulfur content of 0.1 ppm or less and an aniline point of 100 to 120.

An iodine value of zero as the index of the complete hydrogenation means that an iodine value measured according to the test method of iodine value 2.4.5-71 by the Japanese Society of Oil Chemistry is 0.01 or less.

Another organic fluid utilized in the invention other than the liquid paraffin is a synthetic oil. Almost all kinds of polymers generally utilized as the synthetic oil can be utilized in the typical composition of the invention to some extent. Examples of the synthetic oil are random polymers of propylene oxide and ethylene oxide, polymers obtained by addition of propylene oxide or a mixture of propylene oxide and ethylene oxide to alcohols having 3 to 10 carbon atoms, polymers obtained by propoxidation of propylene glycol and ethylene glycol with propylene oxide, polymers obtained by addition of propylene oxide or a mixture of propylene oxide and ethylene oxide to glycerine and the like polymers.

The synthetic oil can be utilized singly, as a mixture of two or more kinds thereof or as a mixture with liquid paraffin, as well. The preferable synthetic oil is a polymer obtained by propoxidation of propylene glycol with propylene oxide, such as Adeka Karpol DL ® (a product of Asahi Denka Kogyo Co., Ltd.).

The synthetic oil has the following properties:

| | |
|---|---|
| specific gravity (25° C.) | 1.004 to 1.008 |
| pH, methanol method | 6.2 to 6.6 |
| viscosity (40° C.) | 31.2 to 149 cst |
| flash point (COC) | 201 to 228° C. |

The emulsion type defoaming agent composition of the invention contains a silicone. The silicone oil can provide the defoaming agent composition with the initial defoaming property.

Examples of the silicone oil utilized in the invention are polysiloxane oils obtained from alkyl siloxanes, aryl siloxanes, alicyclic siloxanes and the like and having the viscosity of about 10 to 3000 cst (25° C.), fluorinated silicone oils and the like. The preferable examples are the polysiloxane oils obtained from alkyl siloxanes.

The amount of the silicone oil utilized in the composition is in the range from 0.5 to 5 weight parts, preferably in the range from 0.8 to 3 weight parts and more preferably in the range from 1 to 2 weight parts.

A hydrophobic silica is present in the emulsion type defoaming agent composition of the invention.

The kind of the hydrophobic silica is not particularly critical and various kinds of the hydrophobic silica can be utilized.

The hydrophobic silica utilized in the invention has a M value preferably of 50 or more and more preferably in the range from 60 to 70. The M value is measured by the method described below.

The hydrophobic silica utilized in the invention has an average diameter preferably of 10 $\mu$m or less, more preferably of 5 $\mu$m or less and most preferably in the range from 1 to 3 $\mu$m.

Other preferable properties of the hydrophobic silica utilized in the invention are the pH value (4% concentration) in the range from 7 to 12, a bulk specific gravity in the range from 63 to 75 g/liter, a specific surface area in an range from 59 to 113 $m^2$/g, the oil absorption in the range from 155 to 210 ml/100 g, a shaking test value in the range from 25 to 50 minutes and a DBA adsorption of 10 mg·mol/kg or less. The hydrophobic silica selected may have one of these properties or, two or more of these properties. A hydrophobic silica having all of these properties is particularly preferable.

The pH value is measured in a mixture of water and ethanol in 1:1 ratio using a pH meter. The M value is the content of methanol in volume % when the silica begins to get wet in an aqueous methanol solution. The shaking test value is the time in minutes elapsed before a sample show turbidity when a mixture containing 0.5 g of the sample silica and 50 ml of water in a 100 ml Erlenmeyer flask is shaken with an Iwaki Laboshaker VS ® (a product of Iwaki Co., Ltd.) at 300 shaking/min.

The hydrophobic silica is generally prepared by the hydrophobic treatment of a hydrophillic silica. Various methods can be utilized for the hydrophobic treatment of the hydrophilic silica. As an example, a silicone oil which is dimethylpolysiloxane is dispersed into a silica uniformly and the dispersion is heated at 250° to 300° C. for 0.5 to 2 hours. This method is described in Japanese Patent Publication 1967-26179.

The amount of the hydrophobic silica in the composition is in the range from 0.5 to 5 weight parts, preferably in the range from 1 to 4 weight parts and more preferably in the range from 1.5 to 3 weight parts.

The composition forming the emulsion type defoaming agent composition of the invention comprises a modified silicone oil.

Examples of the modified silicone oil are silicone oils modified with polyethers, silicone oils modified with fluorine, silicone oils modified with fatty acids and the like. The preferable examples are the silicone oils modified with polyethers.

The modified silicone oil can be utilized singly or as a mixture of two or more kinds.

The silicone oil modified with a polyether comprises modified silicone oils obtained by reaction of an organopolysiloxane, such as dimethylpolysiloxane and the like, with a polyglycol, modified silicone oils obtained by reaction of silica with a silicone and the like compounds.

An example of the silicone oil modified with a polyether has the following formula:

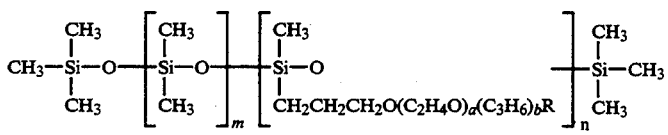

wherein R is an alkyl group having 6 to 22 carbon atoms, a is an integer of 5 to 15, b is an integer of 0 to 5, m is a positive number and n is a number between 10 and 30.

The modified silicone oil described above can be obtained commercially. Examples of such commercial oils are KF353(A)® produced by Shinetsu Kagaku Kogyo Co., Ltd. and Antifoam FS-80® and Antifoam FS-81® produced by Dow Corning Co.

The amount of the modified silicone oil in the composition is in the range from 1 to 40 weight parts, preferably in the range from 3 to 40 weight parts and more preferably in the range from 30 to 40 weight parts.

The emulsion type defoaming agent composition of the invention can be obtained by emulsifying the components described above into water in the presence of an emulsifier.

As the emulsifier, various kinds, such as nonionic emulsifiers, anionic emulsifiers, cationic emulsifiers and amphoteric emulsifiers, can be utilized. The nonionic emulsifiers are preferable among these emulsifiers.

Examples of nonionic emulsifier are polyoxyethylene nonylphenyl ether, polyoxyethylene octylphenyl ether, polyoxyethylene lauryl ether, polyoxyethylene oleyl ether, polyoxyethylene dodecyl ether, polyoxyethylene cetyl ether, polyoxyethylene stearyl ether, polyoxyethylene laurate, polyoxyethylene oleate, polyoxyethylene stearate, sorbitan laurate, sorbitan palmitate, sorbitan stearate, sorbitan oleate, polyoxyethylene sorbitan oleate, polyoxyethylene sorbitan stearate and the like.

Examples of anionic emulsifiers are polyoxyethylene nonylphenyl ether sulfate salts, octylphenoxyethoxyethyl sulfonate salts, alkyl phosphate salts and the like.

Examples of cationic emulsifiers are alkyl benzyl ammonium salts and salts of acetic acid with laurylimidazoline, oleylimidazoline, oleylamine, cetylamine and the like.

Examples of amphoteric emulsifiers are amphoteric surface active agents of alkylbetaine type or phosphoric acid ester type.

The emulsifier can be utilized singly or as a combination of two or more kinds. For example, a cationic emulsifier may be mixed with a nonionic emulsifier or an anionic emulsifier may be mixed with a nonionic emulsifier.

The preferable emulsifiers among the emulsifiers described above are combinations of a polyoxyethylene alkylaryl ethers and a sorbitan oleate. Preferred among these is a combination of polyoxyethylene nonylphenyl ether and sorbitan dioleate. The contents of the components forming the preferable combination of emulsifiers are not particularly limited and can be suitably selected in such a manner that the ratio of polyoxyethylene nonylphenyl ether and sorbitan dioleate is generally in the range from 1/10 to 10/1.

The emulsifier is utilized in the defoaming agent composition in an amount sufficient to emulsify the lipophillic defoaming components of the composition described above. This amount is generally in the range from 1 to 10 weight parts and preferably in the range from 1 to 5 weight parts.

The emulsion type defoaming agent composition is obtained by emulsifying the components described above in water.

The amount of water is not particularly limited and can be utilized in various amount. The amount of water is generally in the range from 30 to 900 weight parts, preferably in the range from 30 to 300 weight parts and more preferably in the range from 30 to 90 weight parts.

To the emulsion type defoaming agent composition of the invention, a thickening agent may be added according to necessity.

Examples of the thickening agent are cellulose ethers, such as carboxymethyl cellulose, carboxyethyl cellulose and the like, acryl-modified polymers, partially saponified polyvinyl alcohol, sodium alginate and the like. The thickening agent is utilized generally in an amount of 1% or less based on 100 weight parts of the composition which is emulsified in water to form the defoaming agent composition.

To the emulsion type defoaming agent composition of the invention, a small amount of a fungicide may be added as a preservative according to necessity. Examples of effective fungicides are sodium hypochlorite, sorbic acid and the like. The amount of the fungicide is generally in the range from 0.05 to 0.5 weight % based on the total amount of the defoaming agent composition.

In the emulsion type defoaming agent composition of the invention, the average size of the emulsion particles is preferably in the range from 1 to 10 $\mu$m and more preferably in the range from 1 to 6 $\mu$m.

The emulsion type defoaming agent composition can be prepared by homogeneously mixing the specific amounts of the components described above by stirring. The preferable method of the preparation is the following.

To 5 to 35 weight parts of the organic fluid, 0.5 to 5 weight parts of the silicone oil and 0.5 to 5 weight parts of the hydrophobic silica are added and the mixture is dispersed by heating at 90° to 100° C. under stirring.

To the dispersion thus prepared, a suitable amount, for example 1 to 10 weight parts, of the emulsifier and 1 to 40 weight parts of the modified silicone are added and the mixture is emulsified by adding a suitable amount of water at 40° to 70° C. to prepare an emulsion.

The amount of the emulsion type defoaming agent composition of the invention utilized in a foaming fluid which requires defoaming can be suitably selected and generally in the range from 0.1 to 1000 ppm and preferably in the range from I to 100 ppm.

In the method of defoaming of the invention, the concentration of the emulsion type defoaming agent composition of the invention is adjusted by dilution to a specified concentration in an apparatus of dilution which can control the concentration of the defoaming agent composition to a specified concentration. The rate of addition of the defoaming agent composition is adjusted to achieve a specified concentration and is then continuously added to the foaming fluid.

As the medium of dilution of the emulsion type defoaming agent composition, water is generally utilized. The ratio of the dilution for adjusting the concentration to a specified value in the apparatus of dilution is not particularly limited and suitably selected according to the amount of the emulsion type defoaming agent composition utilized. The ratio of dilution is generally in the range from 2 to 20 time the undiluted amount.

The continuous addition of the emulsion type defoaming agent composition comprises both uninterrupted addition and intermittent addition.

In the defoaming method of the invention in which the emulsion type defoaming agent composition of the invention is diluted and then added to the foaming fluid, the volume during transportation of the emulsion type defoaming agent composition having the excellent defoaming property can be decreased and, therefore, has the advantages that a large transportation means is not required and that the amount of the storage in a plant can be kept small to reduce the necessary space and the number of empty containers. Thus, the method is industrially highly valuable.

To summarize the advantages obtained by the invention, the emulsion type defoaming agent composition of the invention has excellent defoaming property, such as the initial defoaming property and preservation of the defoaming property during passage of time, does not form pitches from the defoaming agent by itself, prevents pollution of waste water and still exhibits excellent defoaming property. Thus, it is useful as the defoaming agent for aqueous systems, particularly for strongly alkaline aqueous systems. Particularly when it is applied to the waste waters produced in the production of pulp, it exhibits very excellent defoaming effect and is industrially very useful.

The method of defoaming of the invention utilizes the emulsion type defoaming agent composition described above and is very excellent in the defoaming property and in the prevention of formation of pitch.

The invention will be understood more readily with reference to the following examples; however, these examples are intended to illustrate the invention and are not to be construed to limit the scope of the invention.

The emulsion type defoaming agent compositions of the invention were prepared in the Examples of Preparation described in the following.

Example of Preparation 1

To 30 weight parts of a liquid paraffin (a product of Mobile Sekiyu Co., Ltd., White Oil WO70 ®; viscosity at 40° C., 12.4 centistokes), 1 weight part of a silicone oil (a product of Shinetsu Kagaku Kogyo Co., Ltd., Silicone Oil KF96 ®) and 3 weight parts of a hydrophobic silica (a product of Nippon Silica Kogyo Co., Ltd.) were added under stirring and dispersed by heating to 100° C. To the dispersion thus prepared, 1 weight part of polyoxyethylene nonylphenyl ether (6 mols of added ethylene oxide) as the emulsifier, 1 weight part of sorbitan oleate and 3 weight parts of a silicone oil modified with polyether (a product of Shinetsu Kagaku Kogyo Co., Ltd., KF353(A) ®) were added and emulsified by adding 61 weight parts of water at 60° C. to obtain an emulsion composition. The average diameter of the emulsion particles was about 3 μm.

The properties of the hydrophobic silica used here were as following:

| | |
|---|---|
| pH | 11.9 |
| bulk specific gravity | 67 g/liter |
| specific surface area | 87 m²/g |
| oil absorption | 200 ml/100 g |
| average particle diameter | 2.7 μm |
| M value | 65% |
| shaking test value | 50 min. |
| DBA adsorption | 5 mg · mol/kg or less |

(amount of silanol group at the surface of silica)

Example of Preparation 2

An emulsion was prepared by the same method as in Example of Preparation I except that the silicone oil modified with polyether used in Example of Preparation 1 was replaced by 3 weight parts of another silicone oil modified with polyether (a product of Dow Corning Co., Antifoam FS-80 ®). The average diameter of the emulsion particles was about 2 μm.

Example of Preparation 3

To 15 weight parts of the liquid paraffin, 2 weight part of the silicone oil and 1.5 weight parts of the hydrophobic silica were added under stirring and dispersed by heating to 100° C. To the dispersion thus prepared, 0.5 weight part of polyoxyethylene nonylphenyl ether (2 mols of added ethylene oxide) as the emulsifier, I weight part of sorbitan oleate and 30 weight parts of a silicone oil modified with polyether (a product of Dow Corning Co., Antifoam FS-81 ®) were added and emulsified by adding 50 weight parts of water slowly in portions at 60° C. to obtain an emulsion composition. The average diameter of the emulsion particles was about 2 μm.

Example of Preparation 4

To 14.5 weight parts of a polyoxyethylene glycol (a product of Asahi Denka Kogyo Co., Ltd., Adeka Karpol DL-150 ®), 1 weight part of the silicone oil and 1.5 weight parts of the hydrophobic silica were added under stirring and dispersed by heating to 100° C. To the dispersion thus prepared, 1 weight part of polyoxyethylene nonylphenyl ether (6 mois of added ethylene oxide) as the emulsifier, 2 weight part of sorbitan oleate and 30 weight parts of a silicone oil modified with polyether (a product of Dow Corning Co., Antifoam FS-81 ®) were added and emulsified by adding 50 weight parts of water slowly in portions at 60° C. to obtain an emulsion composition. The average diameter of the emulsion particles was about 3 μm.

Comparative Example of Preparation 1

(Commercial product A, silica base)

To 88 weight parts of a spindle oil (a product of Nippon Sekiyu Co., Ltd., Super Oil AL ®; viscosity at 40° C. 23.22 cst), 1 weight part of the silicone oil, 6 weight parts of the hydrophobic silica and 5 weight parts of sorbitan oleate as the dispersing agent were mixed and treated with a homogenizer for 30 minutes to obtain Commercial product A.

Comparative Example of Preparation 2

(Commercial product B, amide base)

To 17 weight parts of the spindle oil, 6 weight parts of stearyl bisamide were added. The mixture was heated to 140° C. to dissolve stearyl bisamide and kept at the same temperature for 15 minutes. The spindle oil containing stearyl bisamide dissolved in it and heated to 140° C. was added rapidly to 71 weight parts of the spindle oil of the room temperature (25° C.) to cool rapidly and a rapidly cooled amide dispersion was prepared. To the rapidly cooled amide dispersion, 1 weight part of the silicone oil and 5 weight parts of sorbitan oleate as the dispersing agent were added and the mixture was treated in a colloid mill (capacity of 5 liter/min.) to obtain Commercial product B.

EXAMPLE 1

A sample of a concentrated black solution taken from a production plant of pulp was diluted to 6 to 10% with water. The diluted black solution (1500 ml) was charged in a cylinder having a diameter of 150 mm and equipped with a jacket and foamed by continuously circulating the solution by using a centrifugal pump at the bottom of the cylinder in such a manner that the solution was injected at the height of 450 mm above the surface of the solution to the surface of the solution with the angle of 90° at the speed of 3 liter/min while the cylinder is heated to 90° C.

The black solution was foamed and the surface of the solution was elevated. When the surface of the solution became higher than the original surface by 50 mm, 15 ppm of the emulsion type defoaming agent composition prepared in Example of Preparation 1 was added to the solution and the height of the solution immediately after the addition was measured.

While the circulation was continued, the foaming increased again with passage of time. The circulation was continued for 10 minutes and the height of the surface of the solution was measured every 2 minutes during this period. After 10 minutes of the circulation, the circulation was stopped. The solution was left standing for 3 minutes and the height of the surface of the solution was measured to evaluate the decrease of the foaming. The circulation was then resumed. During 3 minutes of the resumed circulation, the height of the surface of the solution was measured every minute. After 3 minutes of the resumed circulation, the circulation was stopped. The solution was left standing for 3 minutes and the height of the surface of the solution was measured to evaluate the property of foam breaking and the sustained effect of defoaming.

The results obtained are shown in Table 1.

EXAMPLE 2

Effect of the emulsion type defoaming agent composition was evaluated by the same method as in Example 1 except that the emulsion type defoaming agent composition prepared in Example of Preparation 1 was replaced by the emulsion type defoaming agent composition prepared in Example of Preparation 2. The results are shown in Table 1.

EXAMPLE 3

Effect of the emulsion type defoaming agent composition was evaluated by the same method as in Example i except that the emulsion type defoaming agent composition prepared in Example of Preparation 1 was replaced by a solution obtained by diluting the emulsion type defoaming agent composition prepared in Example of Preparation 3 with water to the concentration of 1/10 of the original concentration and that a 10% solution of the black solution was used. The results are shown in Table 1.

EXAMPLE 4

Effect of the emulsion type defoaming agent composition was evaluated by the same method as in Example 1 except that the emulsion type defoaming agent composition prepared in Example of Preparation 1 was replaced by a solution obtained by diluting the emulsion type defoaming agent composition prepared in Example of Preparation 4 with water to the concentration of 1/10 of the original concentration and that a 10% solution of the black solution was used. The results are shown in Table 1.

Comparative Examples 1 and 2

Effects of Commercial products A and B were evaluated by the same method as in Example 1 except that the emulsion type defoaming agent composition prepared in Example of Preparation 1 was replaced by Commercial products A or B prepared in Comparative Example of Preparation 1 (Commercial product A, silica base) or in Comparative Example of Preparation 2 (Commercial product B, amide base), respectively. The results are shown in Table 1.

Methods of Test of Pitch Formation

Test of pitch formation was conducted on the emulsion type defoaming agent composition prepared in Examples of Preparations 1 to 4 according to the following method.

Into a 200 cc stainless steel beaker, about 1 g of a sample of the emulsion type defoaming agent composition prepared in Example of Preparations 1 to 3 was taken and weighed accurately. A heated black solution (concentration of the black solution, 6%; temperature of the black solution, 70° C.) was added in an amount to make the total amount 100g. The mixture was treated with a homogenizer at the speed of 10000 rpm for 2 minutes. The mixture was then filtered while the mixture was hot with a stainless steel net (200 mesh) which had been dried and weighed in advance and washed with about 50 g of warm water (60° C.). A vigorous method, such as washing with a shower, was avoided for the washing. After the filtration, the stainless steel net was dried at 105° C. for 2 hours and weighed after cooling by standing.

The amount of pitch formation was calculated by the following equation:

the amount of pitch formation=the amount attached to the net (g)/the amount of the defoaming agent composition×100

The amounts of pitch formation of the emulsion type defoaming agent composition prepared in Examples of Preparations 1, 2, 3 and 4 were found to be 0.11, 0.11, 0.13 and 0.10%, respectively. The amount of pitch formation of the Commercial products A and B prepared in Comparative Examples of Preparation 1 and 2, respectively, were found to be 2.9 and 3.15%, respectively.

TABLE 1

| (Part 1) | | |
|---|---|---|
| height of surface of solution before | height of surface of solution after | change of height of surface of solution during the |

TABLE 1-continued

|  | the addition of the defoaming agent composition (mm) | the addition of the defoaming agent composition (mm) | circulation test with time (mm after the time shown at the top) | | | | |
|---|---|---|---|---|---|---|---|
|  |  |  | 2 min | 4 min | 6 min | 8 min | 10 min |
| Example 1 | 50 | 30 | 45 | 50 | 65 | 65 | 65 |
| Example 2 | 50 | 30 | 40 | 50 | 60 | 60 | 60 |
| Example 3 | 50 | 30 | 40 | 40 | 40 | 40 | 40 |
| Example 4 | 50 | 30 | 30 | 35 | 35 | 35 | 35 |
| Comparative Example 1 | 50 | 30 | 45 | 55 | 75 | 95 | 110 |
| Comparative Example 2 | 50 | 35 | 55 | 75 | 100 | 110 | 120 |

(Part 2)

|  | height of surface of solution 3 min. after stopping of the circulation (mm) | change of height of surface during the resumed circulation test with time (mm after the time shown at the top) | | | height of surface of solution 3 min. after stopping of the resumed circulation test (mm) |
|---|---|---|---|---|---|
|  |  | 1 min | 2 min | 3 min |  |
| Example 1 | 0 | 60 | 65 | 65 | 0 |
| Example 2 | 0 | 60 | 65 | 65 | 0 |
| Example 3 | 0 | 40 | 40 | 45 | 0 |
| Example 4 | 0 | 30 | 35 | 35 | 0 |
| Comparative Example 1 | 50 | 90 | 125 | 140 | 70 |
| Comparative Example 2 | 60 | 95 | 135 | 155 | 100 |

While the invention has been particularly shown and described with reference to preferred embodiments thereof, it will be understood by those skilled in the art that the foregoing and other changes in form and details can be made therein without departing from the spirit and scope of the invention.

What is claimed is:

1. An emulsion type defoaming agent composition formed by emulsifying into water in the presence of an emulsifier a composition comprising, per 100 parts of the emulsion thus produced, 5 to 35 weight parts of an organic fluid selected from the group consisting of paraffinic hydrocarbons, naphthenic hydrocarbons, aromatic hydrocarbons, petroleum naphtha and a synthetic oil selected from the group consisting of random polymers of propylene oxide and ethylene oxide polymers obtained by addition of propylene oxide or a mixture of propylene oxide and ethylene oxide to alcohols having 3 to 10 carbon atoms, polymers obtained by propoxidation of propylene glycol and ethylene glycol with propylene oxide and polymers obtained by addition of propylene oxide or a mixture of propylene oxide and ethylene oxide to glycerine, 0.5 to 5 weight parts of an alkyl silicone oil, 0.5 to 5 weight parts of a hydrophobic silica having a pH value (4% concentration) of 7 to 12, a bulk specific gravity from 63 to 75 g/liter, a specific surface area from 59 to 113 m²/g, an oil absorption from 155 to 210 m/100 g, a shaking test value from 25 to 50 minutes, a DBA adsorption of 10 mg.mol/kg or less and an M value of 50 or more; and 1 to 40 weight parts of a silicone oil modified with a polyether, with fluorine or with a fatty acid.

2. An emulsion type defoaming agent composition as claimed in claim 1, wherein the content of the emulsifier is in the range from 1 to 10 weight parts based on 100 weight parts of the emulsion type defoaming agent composition.

3. An emulsion type defoaming agent composition as claimed in claim 1 wherein the organic fluid is a liquid paraffin prepared by the purification with complete hydrogenation and having the iodine value of zero and the kinematic viscosity at 40° C. of 12 to 70 cst.

4. An emulsion type defoaming agent composition as claimed in claim 3, wherein the modified silicone oil is a silicone oil modified with a polyether.

5. An emulsion type defoaming agent composition as claimed in claim 3, wherein the content of the emulsifier is in the range from 1 to 10 weight parts based on 100 weight parts of the emulsion type defoaming agent composition.

6. An emulsion type defoaming agent composition as claimed in claim 1 wherein the organic fluid is a synthetic oil of a polymer obtained by addition of propylene oxide or a mixture of propylene oxide and ethylene oxide to an alcohol or a glycol.

7. An emulsion type defoaming agent composition as claimed in claim 6, wherein the modified silicone oil is a silicone oil modified with a polyether.

8. An emulsion type defoaming agent composition as claimed in claim 1, wherein the content of the emulsifier is in the range from 1 to 10 weight parts based on 100 weight parts of the emulsion type defoaming agent composition.

9. An emulsion type defoaming agent composition as claimed in claim 1 wherein the organic fluid comprises a liquid paraffin prepared by the purification with complete hydrogenation and having the iodine value of zero and the kinematic viscosity at 40° C. of 12 to 70 cst and a synthetic oil of a polymer obtained by addition of propylene oxide or a mixture of propylene oxide and ethylene oxide to an alcohol or a glycol.

10. An emulsion type defoaming agent composition as claimed in claim 9, wherein the modified silicone oil is a silicone oil modified with a polyether.

11. An emulsion type defoaming agent composition as claimed in claim 9, wherein the content of the emulsifier is in the range from 1 to 10 weight parts based on 100 weight parts of the emulsion type defoaming agent composition.

12. An emulsion type defoaming agent composition as claimed in claim 1, wherein the modified silicone oil is a silicone oil modified with a polyether.

13. An emulsion type defoaming agent composition as claimed in claim 12, wherein the content of the emulsifier is in the range from 1 to 10 weight parts based on 100 weight parts of the emulsion type defoaming agent composition.

14. A method of defoaming comprising adding an emulsion type defoaming agent composition of claim 1 to a foaming aqueous fluid continuously or intermittantly at a rate which maintains a constant concentration of the defoaming agent in the aqueous fluid.

15. A method of defoaming a waste water obtained in the production of paper pulp or a strongly alkaline waste water which comprises producing at the site of the waste water an aqueous emulsion of claim 1 from a concentrate otherwise corresponding thereto and water and adding the on-site produced emulsion to the waste water at a rate which maintains a constant defoaming concentration thereof in the waste water.

16. A method of defoaming comprising adding an emulsion type defoaming agent composition of claim 3 to a foaming water, obtained in the production of paper pulp, continuously at a rate which maintains a constant concentration of the defoaming agent in the aqueous fluid.

17. A method of defoaming comprising adding an emulsion type defoaming agent composition of claim 6 to a foaming water, obtained in the production of paper pulp, continuously at a rate which maintains a constant concentration of the defoaming agent in the aqueous fluid.

18. A method of defoaming comprising adding an emulsion type defoaming agent composition of claim 9 to a foaming water, obtained in the production of paper pulp, continuously at a rate which maintains a constant concentration of the defoaming agent in the aqueous fluid.

19. A method of defoaming comprising adding an emulsion type defoaming agent composition of claim 12 to a foaming water, obtained in the production of paper pulp, continuously at a rate which maintains a constant concentration of the defoaming agent in the aqueous fluid.

20. An aqueous silicone oil emulsion suitable for use as a defoaming agent, comprising, dispersed in water containing an emulsifier, 8 to 25 parts by weight of a liquid paraffin; 0.8 to 3 parts by weight of an alkyl polysiloxane oil; 1 to 40 weight parts of a silicone oil modified with a polyether, a fluorine atom or a fatty acid; 1 to 4 parts by weight of a hydrophobic silica having a pH value (4% concentration) of 7 to 12, a bulk specific gravity from 63 to 75 g/liter, a specific surface area from 59 to 113 $m^2/g$, an oil absorption from 155 to 210 m/100 g, a shaking test value from 25 to 50 minutes, a DBA adsorption of 10 mg.mol/kg or less and an M value of 50 or more; each based on 100 parts by weight of the thus-produced emulsion.

* * * * *